(12) United States Patent
Rennie

(10) Patent No.: US 7,687,933 B2
(45) Date of Patent: Mar. 30, 2010

(54) ACCESSORY POWER DISTRIBUTION MODULE

(76) Inventor: William A. Rennie, 521 N. Paulina Ave., Redondo Beach, CA (US) 90277

( * ) Notice: Subject to any disclaimer, the term of this patent is extended or adjusted under 35 U.S.C. 154(b) by 203 days.

(21) Appl. No.: 11/856,572

(22) Filed: Sep. 17, 2007

(65) Prior Publication Data

US 2008/0224539 A1 Sep. 18, 2008

Related U.S. Application Data

(60) Provisional application No. 60/895,284, filed on Mar. 16, 2007.

(51) Int. Cl.
*B60L 1/00* (2006.01)
*B60L 3/00* (2006.01)
*H02G 3/00* (2006.01)

(52) U.S. Cl. ........................................ 307/9.1

(58) Field of Classification Search ................... 307/9.1, 307/10.6
See application file for complete search history.

(56) References Cited

U.S. PATENT DOCUMENTS

| | | | |
|---|---|---|---|
| 3,975,683 A * | 8/1976 | Behrens et al. | 324/767 |
| D330,007 S | 10/1992 | Francis | |
| D349,267 S | 8/1994 | Francis | |
| D409,569 S | 5/1999 | Francis | |
| 6,163,985 A * | 12/2000 | Chinnery et al. | 37/234 |
| 6,247,936 B1 * | 6/2001 | Bullard | 439/49 |
| 6,592,081 B2 * | 7/2003 | Yerge | 246/34 CT |
| 6,674,182 B2 * | 1/2004 | Maynard et al. | 307/10.8 |

OTHER PUBLICATIONS http://www.ronfrancis.com/; Wiring by Ron Francis.

* cited by examiner

*Primary Examiner*—Albert W Paladini
*Assistant Examiner*—Carlos Amaya
(74) *Attorney, Agent, or Firm*—Honigman Miller Schwartz and Cohn LLP

(57) ABSTRACT

A power distribution module for conveying power to one or more accessories is disclosed. The power distribution module includes a constant-hot power bus; an ignition-hot power bus; and at least one output terminal for conveying power to said one or more accessories, wherein the at least one output terminal is selectively capable of providing one of ignition-hot power to said one or more accessories from the ignition-hot power bus, and constant-hot power to said one or more accessories from the constant-hot power bus.

23 Claims, 4 Drawing Sheets

ACCESSORY POWER DISTRIBUTION MODULE

RELATED APPLICATION

This disclosure claims the benefit of Provisional Patent Application No. 60/895,284, filed on Mar. 16, 2007.

FIELD OF THE INVENTION

The disclosure relates to a power distribution module and to a device for conveying power to an electrical accessory.

DESCRIPTION OF THE RELATED ART

It is known in the art that vehicles that are manufactured by an original equipment manufacturer (OEM) may not include one or more options, features, or accessories that are desired by a consumer when the vehicle is purchased by the consumer in a new or previously-owned condition. Is such situations, the consumer may resort to purchasing one or more "aftermarket" accessories, which may be permanently or removably integrated with the vehicle, that provides the function of the one or more options, features, or accessories desired by the consumer.

Exemplar aftermarket accessories may include video entertainment systems, navigation systems, cellular telephones, seat heating systems, computers, battery chargers, lighting systems, and the like. As in most situations, such aftermarket accessories may require power from the vehicle's on-board power source to provide the intended function of the accessory. Typically, the power for the accessory is obtained from a wiring infrastructure extending from the power source, the wires of which may be conveniently located, for example, proximate/behind a dashboard, trim panel, headliner, or the like.

Historically, such aftermarket accessories are typically divided into two categorizations: 1) key-on/ignition-hot accessories that require power only when the vehicle's ignition is on; and 2) key-off/constant-hot accessories that require power at all times, irrespective of the on/off state of the ignition. Because modern vehicles now have dozens, or, even hundreds of wires located, for example, proximate the dashboard area, it may be difficult to locate a dedicated key-on or key-off wire in order to "rewire" and integrate the aftermarket accessory with the vehicle.

Further, because copper wiring is heavy and expensive, and, because vehicle manufacturers are under continuous pressure to decrease vehicle weight while improving fuel economy, many wires are designed to specifically supply an intended electrical load without being able to accommodate the provision for larger electrical loads, as may be associated with an aftermarket accessory. Accordingly, the above factors may lead to a formidable challenge in locating an appropriate key-on/off wire so as to be able to supply the desired electrical load to the accessory.

In addition to the above concerns, the vehicle wiring infrastructure typically interfaces with electronic control modules (ECMs), which are a) relatively fragile, b) intolerant of electrical overloads, and c) potentially operate in conjunction with sensitive electronic switches. Accordingly, in an exemplar aftermarket installation scenario, a digital video disc (DVD) system may, for example, utilize a wire that is dedicated, in design, to a fuel injection ECM.

In an example, a DVD system may share a common wire and operate amicably with a fuel injection ECM even though the common wire is not intended to provide power to the DVD system. However, as an operating dynamic of the DVD system (e.g. soundtrack volume, which may be quantified in decibels) is increased by a user, the DVD system may ultimately cause failure of the ECM. One probable cause of the failure of the ECM is an increased current drain on the wire that may be attributed to a situation when soundtrack volume of the DVD system is increased from a low volume/decibel level past a second, higher volume/decibel level. Accordingly, although the DVD system may operate amicably with the fuel injection ECM when the soundtrack volume/decibel level is set to a relatively low level, the change in soundtrack volume/decibel level from the low level to a higher level may result in the failure of the ECM and subsequent stalling of the vehicle.

Further, if an aftermarket accessory is positively rewired according to an appropriate key-on/off operation, the correct rewiring of the accessory may ultimately prove to be unacceptably noisy due to a power sensitivity of the aftermarket accessory. As a result of these and other factors, even a seemingly simple installation of an aftermarket accessory can therefore become frustratingly difficult, unreliable, expensive, and time-consuming to trouble-shoot should a failure of the accessory and/or vehicle occur.

Accordingly, there is a need in the art for an apparatus that enables an installer/end user to easily select either one or more key-on/off operating modes for one or more aftermarket accessories without the complexities or concerns associated with the rewiring of an aftermarket accessory with the vehicle's existing key-on/off wire infrastructure.

BRIEF DESCRIPTION OF THE DRAWINGS

The disclosure will now be described, by way of example, with reference to the accompanying drawings, in which.

DETAILED DESCRIPTION OF THE INVENTION

The Figures illustrate an exemplary embodiment of a power distribution module in accordance with an embodiment of the invention. Based on the foregoing, it is to be generally understood that the nomenclature used herein is simply for convenience and the terms used to describe the invention should be given the broadest meaning by one of ordinary skill in the art.

Figure 1:
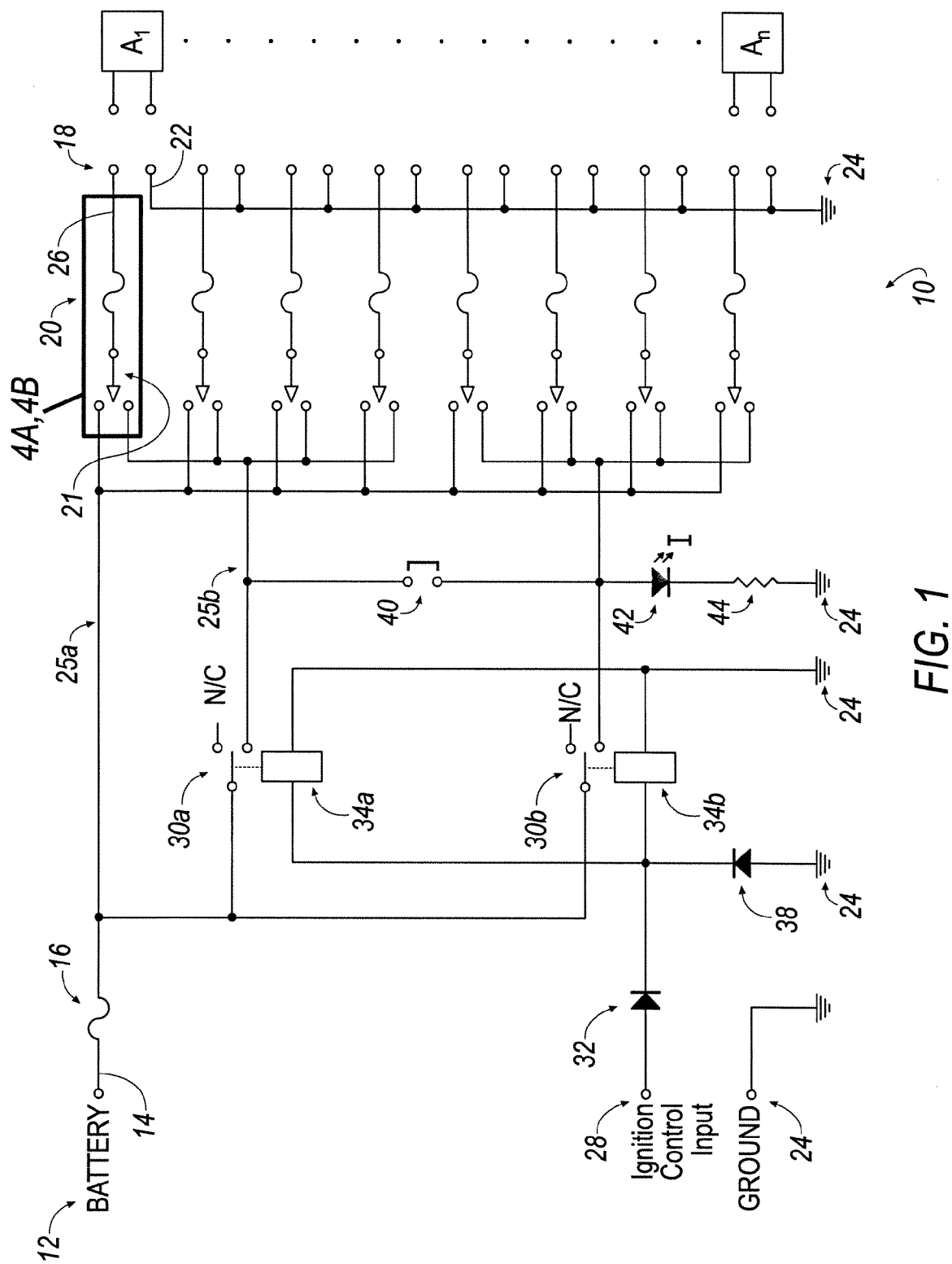
FIG. 1 is a circuit diagram of a power distribution module in accordance with an exemplary embodiment of the invention.

Referring to FIG. 1, a power distribution module is shown generally at 10 according to an embodiment. The module 10 may be operable from power supplied by a vehicle power source, such as, for example, a vehicle battery. A terminal that permits the module 10 to be connected to the power source is shown generally at 12. When the module 10 is installed in a vehicle, the module 10 reduces the potential of damage to or the averse functioning of vehicle operation electronics (e.g. electronic control modules (ECMs) and the like).

In an embodiment, the module 10 may be powered by a single key-off/constant-hot wire, which is shown generally at 14, extending from the power source terminal 12. In an embodiment, the wire 14 may be, for example, approximately a 10-to-8 gauge wire.

In an embodiment, the positive lead of the wire 14 may be connected to a main fuse, which is shown generally at 16. According to an embodiment, the main isolation fuse 16 may be, fore example, a 50-ampere fuse, such that an overload condition of the module 10 will result in the failure of the isolation fuse 16 to ensure that an overload caused by the module 10, or, any accessory, $A_1$-$A_n$, attached to the module 10 does not adversely affect devices (not shown) connected to the remaining wiring infrastructure of the vehicle.

In an embodiment, the module 10 has a plurality of ports, which are shown generally at 18. Each of the plurality of ports 18 are connected to a respective fuse 20.

A key-off/constant-hot power bus is shown generally at 25a for providing power to an accessory, which is shown generally at $A_1$-$A_n$. The power bus 25a is disposed between the main fuse 16 and the respective fuses 20. Accessories, $A_1$-$A_n$, that are connectable to the plurality of ports 18 include, but is not limited to, for example, video entertainment systems, navigation systems, cellular telephones, seat heating systems, computers, battery chargers, lighting systems, and the like.

In an embodiment, the ports 18 may include a polarized, positive-locking connector system to provide a simple and secure plug-in-type connection feature for the accessories, $A_1$-$A_n$. Polarized connectors prevent connectors from being connected improperly (which, if connected improperly, may cause electrical damage to an accessory). Although eight ports 18 are illustrated in FIG. 1, it will be appreciated that any number of ports 18 may be provided, as desired. In an embodiment, each port 18 may provide, for example, up to 11-amperes from the power bus 25a, which is typically adequate for the majority of accessories, $A_1$-$A_n$; however, it will be appreciated that the ports 18 are not limited to providing 11-amperes and that the ports 18 may provide any desirable amount of power for a particular application associated with a particular accessory, $A_1$-$A_n$.

To provide a) convenience, b) minimum supply impedance, c) simplified installation, and d) reduced noise, each port 18 also includes a ground lead 22 connected to ground 24 and a power lead 26 extending from a corresponding port fuse 20. The provision of a power lead 26 and a ground lead 22 at each output 18 may a) reduce the ground impedance and b) provide a low-impedance path directly to the ground terminal 24. In an embodiment, one or more of the ports 18 may be selected according to the position of the corresponding fuse 20, which is explained in greater detail below.

In addition, it will be appreciated that the availability of a ground lead 22 at each port 18 provides several advantages over conventional methodologies associated with providing power to prior art key-on/off accessories. As is known in the art, conventional methodologies for providing power may include, for example, a) drilling a hole through metal structure of the vehicle, b) scraping away paint, c) crimping on a ground terminal, and d) installing a ground screw. Such a conventional creation of a power system ground is subject to reliability problems, as moisture may cause corrosion of the vehicle body and degrade the makeshift ground. Conversely, in the present invention, the provision of a ground lead 22 at each port 18 results in a ready-to-use ground connection such that little or no alteration is provided to the vehicle body.

Referring to FIG. 1, an ignition control input terminal is shown generally at 28. In operation, the ignition control input terminal 28 connects to a wire (i.e., a key-on/ignition-hot wire) in the vehicle to turn on relays, which are shown generally at 30a, 30b, with a low current of, for example, about 250 milliamps to provide key-on power for a key-on power bus, which is shown generally at 25b. This small amount of current can be supplied by most ignition-hot wires in a vehicle, without overload. The power bus 25b is disposed between the relays 30a, 30b and the respective fuses 20.

Referring to FIG. 1, a polarity protection diode, which is shown generally at 32, is connected between the ignition control input terminal 28 and the relay coil terminal(s) 34a, 34b, to prevent the relay(s) 30a, 30b from actuating if the voltage polarity connected to the power source terminal 12 and ground 24 is reversed. Accordingly, the polarity protection diode 32 isolates and prevents potentially serious damage to key-on/ignition-hot accessories, $A_1$-$A_n$, that could otherwise occur. Still referring to FIG. 1, a diode 38 protects and isolates the module 10 against inductive transients from the relay coil(s) 34a, 34b.

The relays 30a, 30b are inexpensive and robust. It will be appreciated, however, that the module 10 is not limited to the use of relays 30a, 30b and that other switches, such as, for example, Field Effect Transistor(s) (FET), could be used instead. In the case where less output current is required, the relay 30a may be deleted from the circuit diagram of the module 10, and, in place of the relay 30a, a jumper 40 may be installed such that a single relay 30b provides the switching function for key-on/ignition-hot power for the power bus 25b.

Still referring to FIG. 1, a light emitting diode (LED) 42, whose operating current is limited by resistor 44, provides an illumination, I, according to the qualification of one or more specified conditions of the module 10. For example, the LED 42 may be illuminated, I, when all of the following conditions are met: a) leads of the battery 12 and ground 24 are connected, b) the polarity of the leads of battery 12 and ground 24 are correct, c) the main fuse 16 is intact, d) the ignition control input terminal 28 is active, and e) the relay(s) 30a, 30b are functioning correctly. Accordingly, when the LED 42 is lit, the LED 42 gives the installer/end user a high degree of confidence that the module 10 is installed properly and functioning, as desired.

In operation, the module 10 employs a fusing scheme that permit the ports 18 to provide easy selection of key-on/ignition-hot or key-off/constant-hot power according to the power needs of a particular accessory, $A_1$-$A_n$. As seen in FIG. 1, each port 18 is associated with a selectable fusing configuration. In operation, the fuse 20 may be connected to a single pole double throw switch 21 to provide desired key-on/ignition-hot power from the power bus 25b or key-off/constant-hot power from the power bus 25a to a particular accessory, $A_1$-$A_n$, depending on the up/down position of the switch 21. Alternatively, as shown in FIGS. 4A and 4B, in an embodiment, a physical switch 21 as shown in each of FIGS. 1-3 may be eliminated and the fuse 20 may be physically plugged in to one of two ports 23a (FIG. 4A) or 23b (FIG. 4B) to provide desired key-on/ignition-hot power from the power bus 25b or key-off/constant-hot power from the power bus 25a to a particular accessory, $A_1$-$A_n$. Whether a switch 21 is used or the approach set forth in FIGS. 4A and 4B is used, both techniques are electrically equivalent (although the technique set forth in FIGS. 4A and 4B may be more cost effective because it eliminates the need for an electrical switch 21).

According to the embodiment of FIGS. 4A and 4B, the port fuse 20 may be selectively inserted in one of two positions. For example, in a first, "up" position shown in FIG. 4A, the fuse 20 provides for key-off/constant-hot power from the power bus 25a, whereas, in the second, "down" position shown in FIG. 4B, fuse 20 provides for key-on/ignition-hot power from the power bus 25b. Accordingly, the selectable fusing configuration enables the installer or end user to quickly and easily select key-on/ignition-hot or key-off/constant-hot power delivery mode for a chosen accessory, $A_1$-$A_n$, connected at a particular port 18 without having to locate and physically connect a wire from the vehicle's existing wire infrastructure to an accessory, $A_1$-$A_n$. In an embodiment, and without limitation, the port fuse 20 may be referred to as an Automotive Type Miniature (ATM) fuse.

Figure 2:
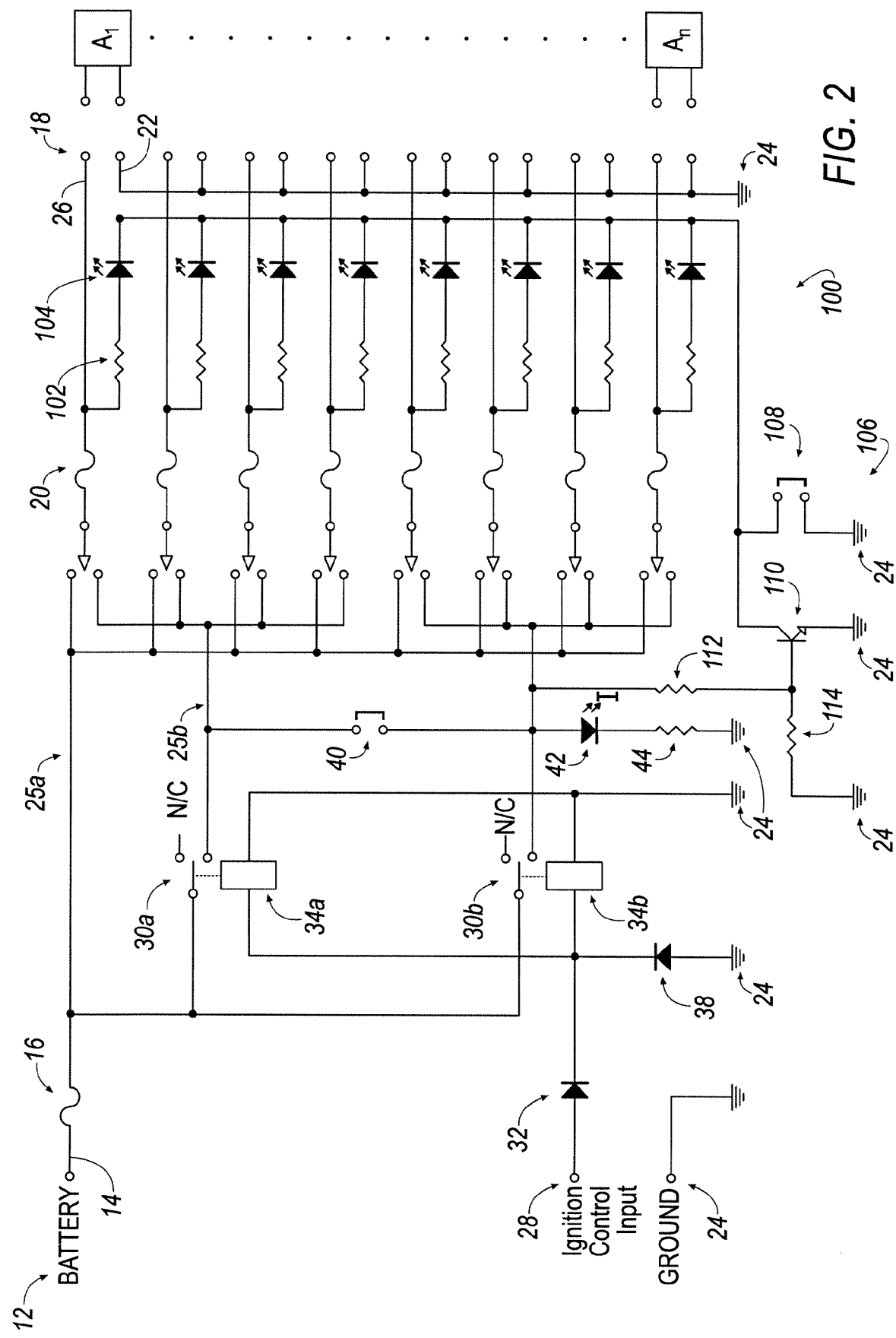
FIG. 2 is a circuit diagram of a power distribution module in accordance with an exemplary embodiment of the invention.

Referring now to FIG. 2, a power distribution module is shown generally at 100 according to an embodiment. The power distribution module 100 is substantially similar to the module 10 with the exception that that module 100 includes a current-limiting resistor 102 and LED 104 connected at each power lead 26.

According to an embodiment, the LED 104 will illuminate if power is present and if the associated fuse 20 is intact. Thus, when the LED 104 is not illuminated, a non-illuminated LED 104 will serve as an indicator of a situation where power is not available such that the fuse 20 is "blown" or missing.

According to an embodiment, a means for inhibiting illumination of the LED 104 is also shown generally at 106. The means 106 includes a jumper 108, a transistor 110, and resistors 112, 114. In operation, the means 106 prevents the LED 104 from being illuminated unless an ignition control input seen at the ignition control input terminal 28 is activated (i.e., the ignition is "on").

In an embodiment, if the jumper 108 is included without the transistor 110 and resistors 112, 114, the LEDs 104 associated with key-off/constant-hot outputs will illuminate without regard to the status of the ignition control input terminal 28. However, as explained above with regarding to certain aftermarket accessory installation scenarios, the resulting current drain on the vehicle's battery may be undesirable, in which case, the jumper 108 can be deleted and transistor 110 and resistors 112, 114 may be included. In this case, even the key-off/constant-hot LED(s) 104 will not illuminate unless the ignition control input terminal 28 is active. Accordingly, in the latter implementation without the jumper 108, the means 106 reduces the operating current to zero when the ignition is off.

Figure 3:
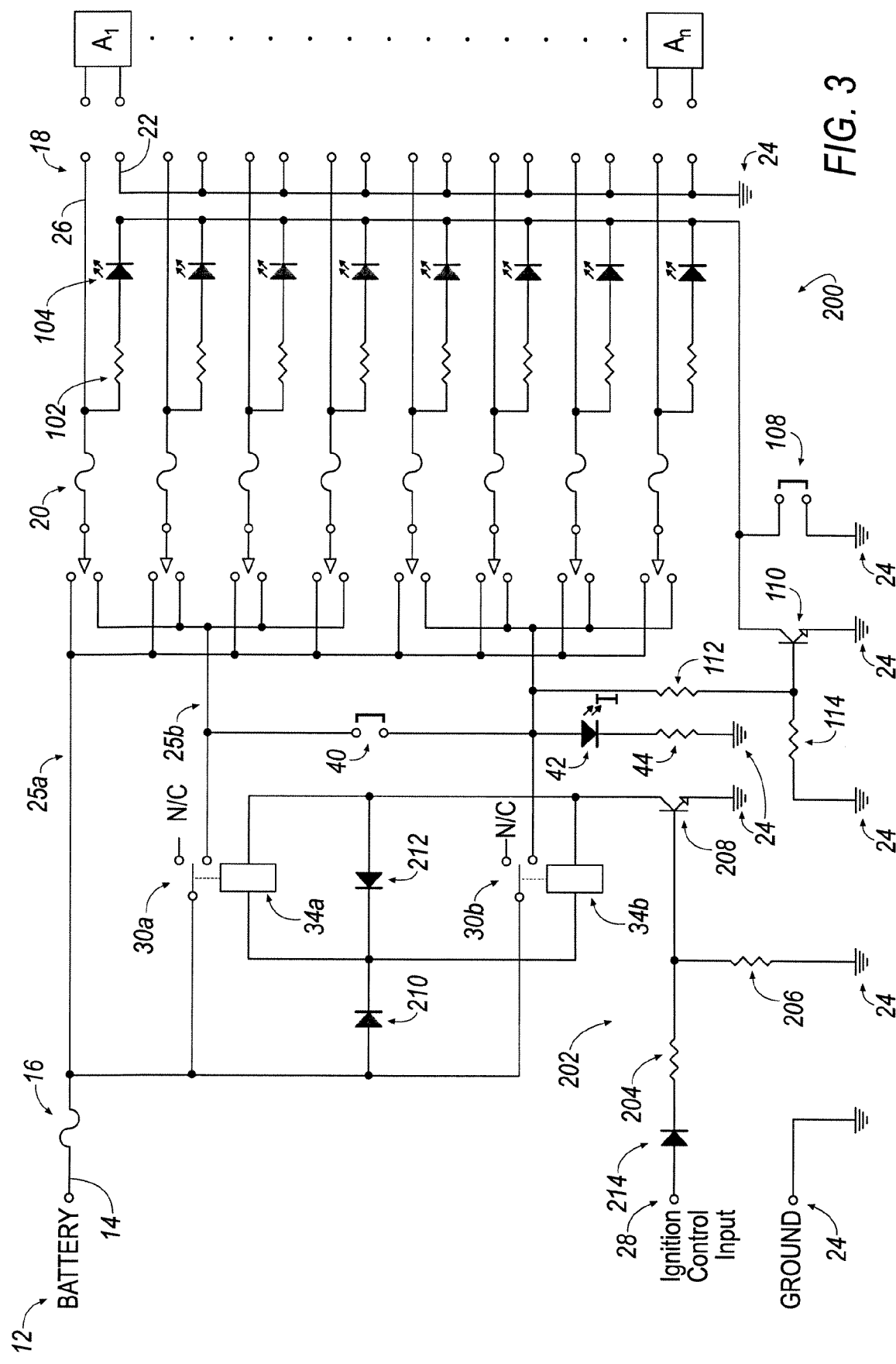
FIG. 3 is a circuit diagram of a power distribution module in accordance with an exemplary embodiment of the invention.
Figure 4A:
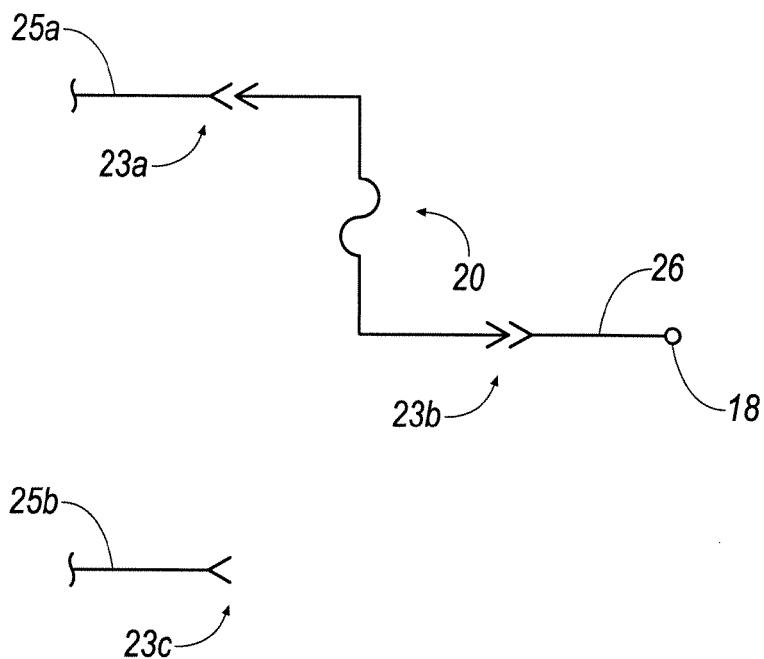
FIGS. 4a and 4b are schematic depictions of a fuse placed in first and second positions respectively.
Figure 4B:
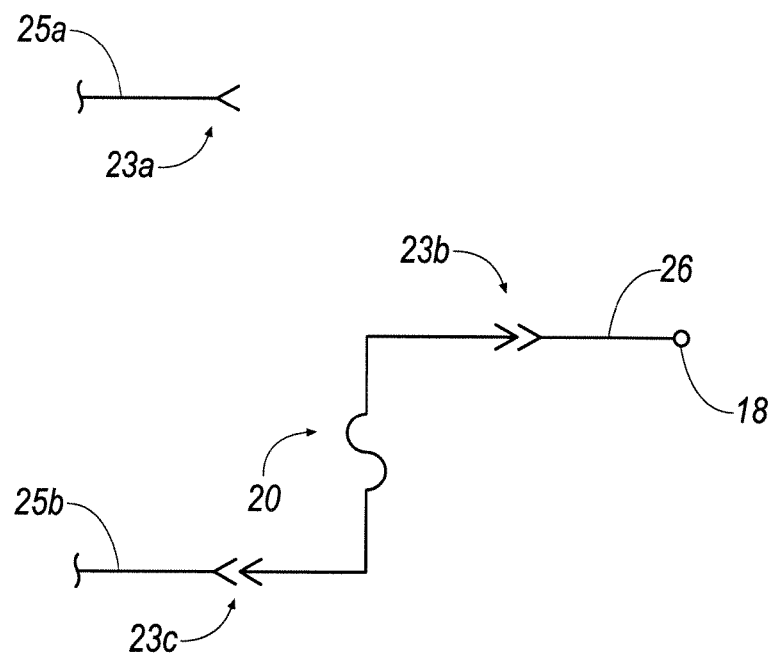

Referring now to FIG. 3, a power distribution module is shown generally at 200 according to an embodiment. The power distribution module 200 is substantially similar to the module 100 with the exception that that module 200 includes an amplifier 202 connected between the ignition control input terminal 28 and the relay coils 34a, 34b. In operation, the amplifier 202 reduces drive current needed to activate the ignition control input terminal 28.

In an embodiment, the amplifier 202 reduces the input current to a few milliamps, which may be supplied by virtually any desirable ignition-hot wire. In an embodiment, the amplifier 202 includes resistors 204, 206 and a transistor 208. If necessary, it will be appreciated that an FET could be used in place of the transistor 208 to further reduce the drive current.

In an embodiment, diode 210 functions substantially similarly as diode 32 such that the diode 210 functions as a polarity-protection diode so that relays 30a, 30b will not activate if the power polarity is reversed. In an embodiment, diode 212 functions substantially similarly as diode 38 such that the diode 212 functions as an inductive transient clamp to protect transistor 208. In an embodiment, diode 214 protects transistor 208 from reverse base-emitter breakdown if the power to the main terminals 14 and 24 is reversed.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A power distribution module for conveying power to one or more accessories, comprising:
    a constant-hot power bus;
    an ignition-hot power bus; and
    at least one output terminal for conveying power to said one or more accessories, wherein the at least one output terminal is selectively capable of providing one of
        ignition-hot power to said one or more accessories from the ignition-hot power bus, and
        constant-hot power to said one or more accessories from the constant-hot power bus;
    a power source terminal;
    a main fuse disposed between the power source terminal and the at least one output terminal; and
    at least one fuse disposed between the at least one output terminal and the main fuse;
    an ignition control input terminal;
    one or more relays disposed between the ignition control input terminal and the at least one fuse;
    a current limiting resistor; and
    a light emitting diode connected to the current limiting resistor, wherein the current limiting resistor and light emitting diode are operably connected between said at least one fuse and a power output lead of said at least one output terminal.

2. The power distribution module according to claim 1, wherein the output terminal includes one or more power output leads and a ground bus.

3. The power distribution module according to claim 1, wherein the at least one fuse is connected to a switch and adapted to function as a single-pole double-throw fused switch to provide a selectable fusing configuration.

4. The power distribution module according to claim 1, wherein the at least one fuse is orientable into one of two positions to provide a selectable power delivery mode for said at least one output terminal.

5. The power distribution module according to claim 1, further comprising:
    a polarity protection diode disposed between the ignition control input terminal and the one or more relays.

6. The power distribution module according to claim 5, wherein the one or more relays include a relay coil terminal.

7. The power distribution module according to claim 1, further comprising:
    a light emitting diode operably connected to said power source terminal, said ignition control input terminal, and said at least one output terminal; and
    a current limiting resistor connected between the light emitting diode and ground.

8. The power distribution module according to claim 1, further comprising:
    a means for inhibiting illumination of the light emitting diode, wherein the means is disposed between the light emitting diode and the one or more relays.

9. The power distribution module according to claim 8, wherein the means includes:
    a jumper connected to the light emitting diode;
    a transistor connected to the jumper; and a first resistor and a second resistor connected to the transistor.

10. The power distribution module according to claim 1, further comprising:
an amplifier disposed between said ignition control input terminal and said one or more relays.

11. The power distribution module according to claim 10, wherein the amplifier includes:
a first resistor;
a second resistor; and
a transistor connected to the first and second resistors.

12. A power distribution module for conveying power to one or more accessories, comprising:
a constant-hot power bus;
an ignition-hot power bus;
a plurality of output terminals; and
means for selectively providing one of
ignition-hot power to said one or more accessories from the ignition-hot power bus at the plurality of output terminals, and
constant-hot power to said one or more accessories from the constant-hot power bus at the plurality of output terminals, wherein the means includes at least one fuse;
a power source terminal;
a main fuse disposed between the power source terminal and the plurality of output terminals, wherein the at least one fuse is disposed between the plurality of output terminals and the main fuse;
an ignition control input terminal; and
one or more relays disposed between the ignition control input terminal and the at least one fuse;
a current limiting resistor; and
a light emitting diode connected to the current limiting resistor, wherein the current limiting resistor and light emitting diode are operably connected between said at least one fuse and a power output lead of said plurality of output terminals.

13. The power distribution module according to claim 12, wherein the plurality of output terminals include a plurality of output leads and a ground bus.

14. The power distribution module according to claim 12, wherein the at least one fuse is connected to a single-pole double-throw switch.

15. The power distribution module according to claim 12, wherein the at least one fuse is insertable into one of two positions to provide a selectable power delivery mode for each of said plurality of output terminals.

16. The power distribution module according to claim 12, further comprising:
a polarity protection diode disposed between the ignition control input terminal and the one or more relays.

17. The power distribution module according to claim 16, wherein the one or more relays include a relay coil terminal.

18. The power distribution module according to claim 12, further comprising:
a light emitting diode operably connected to said power source terminal, said ignition control input terminal, and said plurality of output terminals; and
a current limiting resistor connected between the light emitting diode and ground.

19. The power distribution module according to claim 12, further comprising:
a means for inhibiting illumination of the light emitting diode, wherein the means is disposed between the light emitting diode and the one or more relays.

20. The power distribution module according to claim 19, wherein the means includes:
a jumper connected to the light emitting diode;
a transistor connected to the jumper; and
a first resistor and a second resistor connected to the transistor.

21. The power distribution module according to claim 12, further comprising:
an amplifier disposed between said ignition control power source terminal and said one or more relays.

22. The power distribution module according to claim 21, wherein the amplifier includes:
a first resistor;
a second resistor; and
a transistor connected to the first and second resistors.

23. A power distribution module for conveying power to one or more accessories, comprising:
a constant-hot power bus;
an ignition-hot power bus; and
at least one output terminal for conveying power to said one or more accessories, wherein the at least one output terminal is selectively capable of providing one of
ignition-hot power to said one or more accessories from the ignition-hot power bus, and
constant-hot power to said one or more accessories from the constant-hot power bus;
a power source terminal;
a main fuse disposed between the power source terminal and the at least one output terminal; and
at least one fuse disposed between the at least one output terminal and the main fuse;
an ignition control input terminal;
one or more relays disposed between the ignition control input terminal and the at least one fuse;
an amplifier disposed between said ignition control input terminal and said one or more relays;
a first resistor;
a second resistor; and
a transistor connected to the first and second resistors.

* * * * *